(12) United States Patent
Gulli et al.

(10) Patent No.: US 6,590,961 B1
(45) Date of Patent: Jul. 8, 2003

(54) CALL PROTECT SYSTEMS WITH HANDOFF REDUNDANCY

(75) Inventors: Roy A. Gulli, Mount Sinai, NY (US); Stephen M. Chiro, Oakdale, NY (US); Jacob Levine, Port Jefferson Station, NY (US); Govardhan Srikant, East Patchogue, NY (US); George M. Comstock, Stony Brook, NY (US); Robert F. Krolick, Islip, NY (US)

(73) Assignee: Nortel Networks Limited, St. Laurent (CA)

( * ) Notice: Subject to any disclaimer, the term of this patent is extended or adjusted under 35 U.S.C. 154(b) by 189 days.

(21) Appl. No.: 09/689,101

(22) Filed: Oct. 12, 2000

(51) Int. Cl.[7] .......................... H04M 1/24; H04M 3/08; H04M 3/22
(52) U.S. Cl. ........................................ 379/9; 379/9.05
(58) Field of Search .................. 379/1.01, 2, 9–9.06, 379/14–14.01, 15.01–15.05, 17, 219, 220.01–221.04, 229–230

(56) References Cited

U.S. PATENT DOCUMENTS 5,848,128 A * 12/1998 Frey
5,974,114 A * 10/1999 Blum et al.

* cited by examiner

Primary Examiner—Duc Nguyen
(74) Attorney, Agent, or Firm—Kenneth P. Robinson

(57) ABSTRACT

Call-protect systems are arranged, upon an operating failure, to handoff a call in progress and maintain processing of the call without disruption or need to reinitiate. Application processor (AP) nodes are configured to continuously run standby call processing (CP) facilities, in addition to running active call processing facilities engaged in current call processing. As a call is actively processed, call context information, such as caller and account identification and call status, is stored in memory within a call processing subsystem. Upon a failure affecting the AP node processing a call, call handoff is made to the standby CP facility of a different AP node. The capability of maintaining processing of the handoff call without disruption is enhanced by retrieval of the stored call context information for that call.

27 Claims, 2 Drawing Sheets

CALL PROTECT SYSTEMS WITH HANDOFF REDUNDANCY

FIELD OF THE INVENTION

This invention relates to telephony systems which process incoming calls, and, more particularly, to fault tolerant arrangements to maintain uninterrupted call processing.

BACKGROUND OF THE INVENTION

Telephony systems of different types are available for a variety of applications. A typical application involves processing of informational inquiries by callers using an "800" type telephone service. An incoming call is routed to one of a number of application processor stations (or nodes) which may be a computer workstation enabling access to an individual prepared to provide personal service, to a voice operating system and to other capabilities suitable for providing a response to caller inquiries.

Upon occurrence of a short or longer term equipment or other failure affecting a call while it is being responded to via an application processor, an incoming call may be interrupted or lost. Such call interruption or loss can result in user-call back, user irritation and dissatisfaction, operating inefficiency, etc.

Approaches to alleviating this type of problem have typically relied upon standby-redundancy or hardware-redundancy with synchronization aspects. In the former, a standby processor may be provided, with provision to assume the role of a disabled processor node and restart application capabilities. Nevertheless, calls in progress may typically be lost or interrupted. In the latter, more complex computers arranged with hardware running in parallel for fault tolerant operation may be configured to include synchronization capabilities intended to enable call handoff. Such prior configurations, which as a practical matter may not be able to maintain call processing when a failure occurs, are generally subject to one or more disadvantages such as excessive cost, excessive complexity, inability to avoid call interruption or loss, and low reliability under actual operating conditions.

SUMMARY OF THE INVENTION

Accordingly, provided is a call-protect handoff system, fault responsive to maintain processing of a user-call, including a user-call controller to route a user-call and an application processor (AP) node. The user-call controller includes memory having call context information storage to store context information regarding user-calls while such calls are in progress. The AP node includes two call processing (CP) facilities. An active CP facility is communicatively-coupled to the user-call controller such that the active CP facility can process user calls routed by the user-call controller. A standby CP facility is coupled to the same or another user-call controller such that upon a failure event affecting the active CP facility processing a user-call, the user-call controller communicatively-couples the standby CP facility to maintain processing of that user-call for continued processing supported by use of call context information stored for that user-call in the call context information storage.

In a further aspect, a network call-protect handoff system is provided. The system includes a call processing subsystem to receive user-calls, with a plurality of user-call controllers. Each user-call controller is arranged to control at least one specific user-call and the subsystem includes memory to store call context information regarding that call. The system includes a coupling arrangement, such as a local area network. A plurality of application processor (AP) nodes are coupled via the coupling arrangement to the call processing subsystem to process user-calls. Each AP node includes at least two call processing (CP) facilities (i) an active CP facility coupled to one user-call controller and (ii) a standby CP facility. The system is configured with each user-call controller actively coupled to the active CP facility of a selected AP node for processing of the specific user-call. Each user-call controller is arranged, upon a failure event affecting the selected AP node, to cause handoff of the specific user-call to an available standby CP facility of a different AP node to maintain processing of that call by use of call context information retrieved from memory. The AP node processing a user-call is arranged, in cooperation with an associated network interface card in the user-call controller, to store such call context information in the memory (e.g., in a call context information storage) while the call is being processed. Upon occurrence of a failure event, the AP node receiving handoff of the call is arranged to access stored call context information from the memory, to maintain processing of the call. To facilitate uninterrupted handoff, standby CP facilities are typically arranged to run in a standby mode when no user-call controller is actively coupled thereto.

For a better understanding of the invention, together with other and further objects, reference is made to the accompanying drawings and the scope of the invention will be pointed out in the accompanying claims.

DETAILED DESCRIPTION

Figure 1:
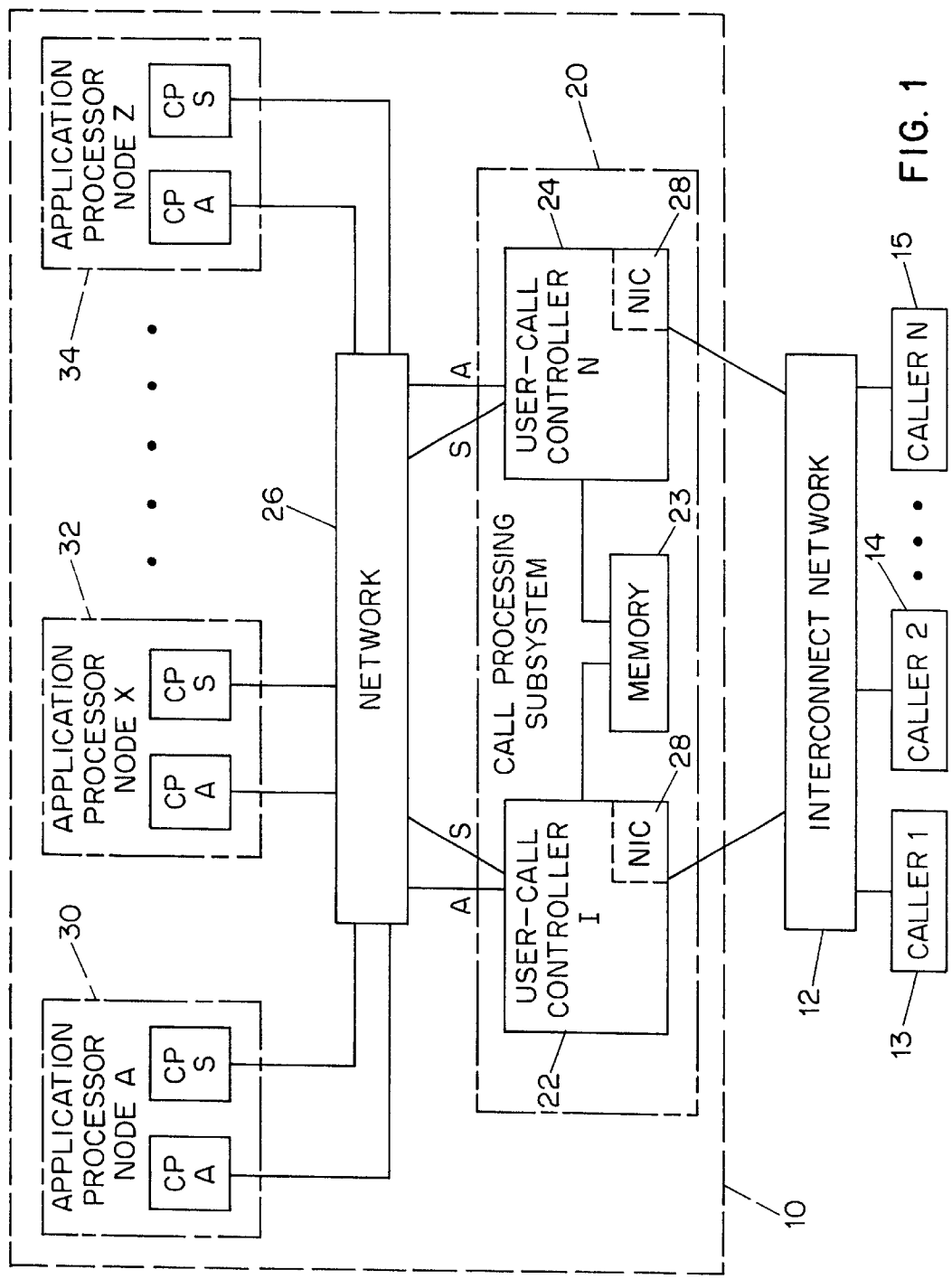
FIG. 1 is a block diagram of a call-protect handoff system in accordance with the invention.

FIG. 1 illustrates an embodiment of a call-protect handoff system 10 in accordance with the invention. System 10 is arranged to provide fault responsive operation in order to actively maintain processing of a user-call already in progress when a failure event affects operation of a processor which is handling the call. As shown, system 10 receives user-calls via an interconnect network 12. The network 12 may be a public telephone network or other suitable communication facility enabling two-way communication via wire, Internet, etc. Users are represented by callers 1, 2 and N, illustrated by boxes 13–15, that may use telephone instruments, personal computers, etc., to place or receive calls via network 12. The system will typically be configured to serve a plurality of callers or call recipients initiating or receiving individual calls via "800" type service or otherwise. For ease of discussion, description may be in terms of calls received, however, it will be understood that calls initiated by or to a user or caller may be processed pursuant to the invention.

The call-protect handoff system 10 includes a call processing subsystem 20 to receive user-calls as connected (e.g., communicatively coupled) by network 12. Subsystem 20 has a plurality of user-call controllers illustrated by units 22 and 24, with the respective user-call controllers N and I typically representative of inclusion of a larger number of such controllers. While higher call capacity configurations may be employed, for present purposes each of user-call controllers I and N (units 22 and 24) is considered as controlling a single specific call from a different user (e.g., from callers 1 and N of units 13 and 15). Call processing subsystem 20 may provide additional functions in known manner and each user-call controller may typically include a network interface card (NIC) as indicated at 28 in unit 24. Memory 23 to store call context data for a specific user-call (e.g., identification of caller or account, PIN number, call subject matter, call status, etc.) is included in subsystem 20 or each user-call controller, as appropriate. For this purpose, memory 23 may include or take the form of call context information storage. Availability of such call context data in memory is used to enhance the effectiveness of call handoff without interruption upon the occurrence of an operating failure. User-call controllers may also provide multi-call and other capabilities in known manner.

As illustrated, the call-protect handoff system is communicatively coupled via a network 26, which may be a local network, an Ethernet or other type of suitable interconnection and data transfer configuration.

In FIG. 1, the call-protect handoff system 10 also has a plurality of application processor nodes (sometimes referred to herein as "AP" nodes) shown as units 30, 32, 34, also referred to as AP nodes A, X and Z, which are typically representative of the presence of a larger number of such nodes. Each of the AP nodes is coupled to the call processing subsystem 20 through network 26. Each AP node may be provided as a computer work station or other computer-based unit having suitable capabilities and running appropriate operating and other programs in active and standby modes, as will be described further. Each AP node may typically control the application of call response capabilities, such as voice operating systems and data/voice storage and retrieval facilities, as well as enabling operator control and participation in responding to and processing user-calls.

As shown, each of the AP nodes represented by units 30, 32 and 34 has at least two call processing facilities (sometimes referred to herein as "CP" facilities). CP facility A, of node 30, executes control-software providing the capability for processing one or more user-calls (e.g., in the context of a computer work station) essentially without user intervention, or with referral to an agent or operator, as appropriate. For this purpose, CP facility A may be provided as a commercially-available voice operating system, enhanced or modified as appropriate for a new application. Such systems are available from Nortel Networks of Brampton, Ontario, Canada as the Periphonics Voice Processing System ("VPS"). CP facility A is arranged to function as the control-software routinely utilized in actively processing user calls for which AP node 30 has responsibility. That is, CP facility A controls with respect to CP facility S by having responsibility to provide actions carried out accordingly with respect to timing and order relative to other call handling activities.

Also, node 30 supports CP facility S, which has a parallel suite of the software executed in the CP facility A. However, whereas CP facility A functions as the active software routinely used in controlling processing calls by AP node A, CP facility S functions as standby software application not used during ordinary operations to control call processing. In this regard, CP facility S is "on", or is available for call processing, but begins to control the processing of a call only when a call is transferred to AP node 30 in response to a failure elsewhere in the system 10.

In FIG. 1, each of the other AP nodes X and Z, shown as units 32 and 34, may be similar to AP node A as described or may have other capabilities. It will be understood that, while processing of a single call is addressed for purposes of simplicity of description, multiple call processing capabilities may be provided utilizing known techniques.

More particularly, the AP nodes A, X and Z are coupled to the call processing subsystem 20 via the coupling arrangement shown as network 26. Each AP node A, X and Z has at least two CP facilities, (i) an active CP facility A coupled to one user-call controller and (ii) a standby CP facility S coupled to another user-call controller. The call-protect handoff system 10, in the FIG. 1 example, is thus configured with user-call controller I which is actively coupled to the controlling CP facility A of AP node A and also coupled to the standby CP facility S of AP node X. Correspondingly, user-call controller N is actively coupled to the active CP facility A of AP node Z and also standby coupled to the standby CP facility S of AP node A. CP facility A of AP node X and CP facility S of AP node Z are available for coupling to additional user-call controllers as desired.

In operation with this configuration, calls received by user-call controllers I and N are respectively coupled to the active CP facilities A of AP nodes A and Z. At the same time, user-call controllers I and N are also respectively coupled on a standby basis to the standby CP facilities S of AP nodes X and A. Notably this configuration provides that each user-call controller is arranged for handoff of a user-call under its control to its associated standby CP facility, upon a failure affecting operation of its actively coupled CP facility. Thus, a call received by user-call controller I may routinely be processed by CP facility A of AP node A. However, upon a failure affecting operation of AP node A, user-call controller I will implement handoff of the user-call currently in progress to the standby CP facility S of AP node X.

More generally, call handoff to a standby CP facility may be implemented on a predetermined basis as just described, or dynamically by choice of a standby CP facility when the need arises. Thus, upon a failure event affecting processing of a specific user-call by an active CP facility in a particular AP node, the relevant user-call controller can be arranged to identify an available standby CP facility in another AP node. The user-call controller then causes the handoff of the specific user-call to the identified standby CP facility to maintain processing of the call. With retrieval of associated call context information for that call, the CP facility receives the call and the call history and status to enable a running handoff. With adequate call context information, it is possible to provide continuing uninterrupted call processing without disruption to the caller. While reference is made to a failure event affecting operation, it will be appreciated that call handoff may be implemented on any interruption in call processing by an AP node, whether representing only a temporary or momentary processing interruption, or a permanent or continuing failure. The word "failure" is used in its dictionary sense of cessation of proper functioning or performance, and includes the inability of a component of the call handoff system to operate reliably or operate at all. For example, a failure event can occur through a loss of power.

The deployment of active (A) and standby (S) CP facilities of an application processor node provides new and improved call handoff systems. As described herein, there may be provided uninterrupted call maintenance by handoff following application processor failure, and automated handoff achieved without call loss or user-awareness of interruption. Also, with application processor nodes 30, 32, and 34, actively handling a user call, with standby processing, fault tolerant operation is achievable although standard or commercially-available hardware having limited hardware redundancy is used.

With inclusion of network interface cards (referred to as "NIC") 28 within user-call controllers I and N to control user-calls, application of known techniques enables provision for call monitoring and call handoff upon a processing failure event affecting the AP node actively, or presently, processing a call. As an additional feature, user-call controllers 22 and 24 may be arranged to transfer calls back to the original AP node after it returns to operational availability. While a specific interconnection pattern between user-call controllers I and N and AP nodes A, X and Z has been described with reference to FIG. 1, it will be appreciated that any suitable interconnection pattern may be used, provided each user-call controller is coupled to the active CP facility of one AP node and to the standby CP facility of a different AP node, or interconnection may be made dynamically at the time of failure, as described.

As discussed above, storage of call-specific context information in memory 23 accessible by the user-call controller handling a call, allows the use of such information at the time of call handoff to facilitate continued processing without service interruption. Upon transfer of a call in response to a failure, the AP node receiving the call handoff will, in performance of its standby function, maintain processing. Following the handoff the recipient AP node then may be processing both the handoff call and an active previous call which was already in progress at the time of handoff. In this example, the previous call will continue to be processed by CP facility A and the handoff call will be processed by CP facility S of the same AP node. Each CP facility typically encompasses its own voice operating system program with access also to related processing, storage and other resources.

With the current level of development of relevant technology, once having an understanding of the invention a skilled person will be capable of implementation using known types of software and hardware approaches. The following discussion will address particular aspects of a currently preferred implementation. Call processing subsystem 20 may comprise a Call Processing Subsystem as utilized in the Periphonics Voice Processing Systems (VPS) manufactured and sold by Nortel Networks of Bohemia, New York. Each of user-call controllers I and N may take the form of a Digital Trunk Controller as utilized in such VPS equipment and including suitable network interface cards. Each controller may be arranged to support digital telephone lines, analog lines and digital signal processing, including tone generation and decoding functions to support DTMF detection and dialing, and other control aspects.

Figure 2:
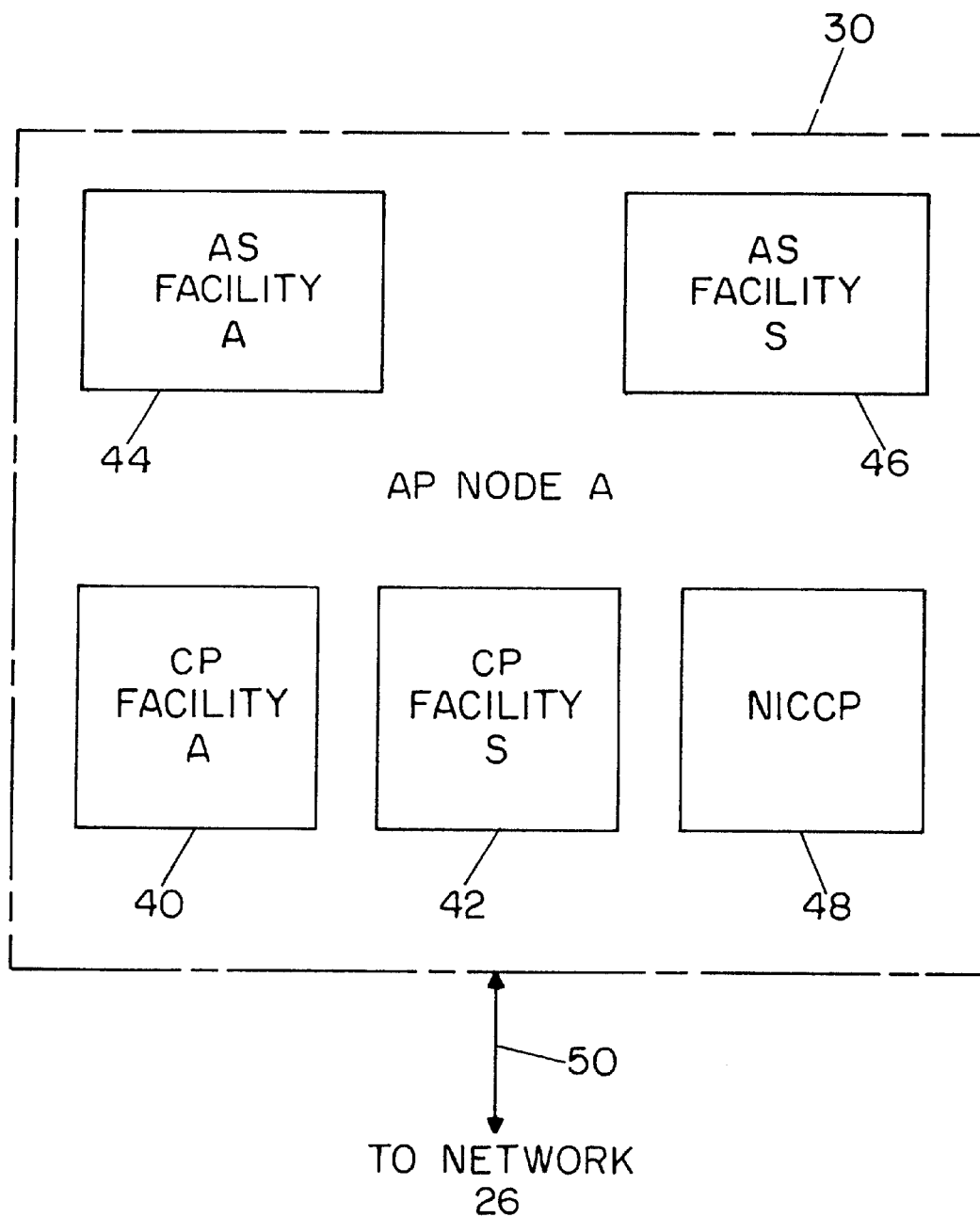
FIG. 2 provides greater detail for an application processor node of FIG. 1.

FIG. 2 is a detailed representation of an AP node of FIG. 1 (e.g., unit 30). Unit 30 may be provided as a computer work station (for example, an Enterprise Server as commercially available from Sun Microsystems) including a suitable operating system (for example, a Solaris Operating System as commercially available from Sun Microsystems). As shown, unit 30 includes the previously discussed CP facilities A and S, represented by respective blocks 40 and 42. Also included are AS (application services) facilities A and S, represented by respective blocks 44 and 46, and an NICCP (network interface card control program) facility, represented by block 48. The latter units will be further described. Consistent with prior description above, a single broadband data bus 50 is illustrated to carry the data interchange between AP node A and other portions of system 10, via the network 26. As represented in FIG. 2, unit 30 may take the form of a suitable computer work station running an appropriate operating system and arranged to support the various described facilities implemented as software programs running on the work station.

As noted, the representative AP node 30 additionally includes a number of software facilities. Each of the CP facilities A and S may have voice operating system (VOS) software of the type provided by Nortel Networks. Each of the AS facilities A and S represents an application services facility arranged to support the respective active (A) and standby (S) functions of the AP node and may provide software applications suitable for overall aspects of line and call control. Each AS facility may thus be configured to control the flow of a call, answer an incoming call, play prompts, record messages, collect DTMF digits, place calls, bridge an incoming caller to an outgoing phone line, etc., in known manner.

The NICCP facility 48 represents a network interface card control program running within the AP node. The NICCP facility provides master/slave functions to control bridging functionality and connection in active and standby operation (e.g., to enable activation from standby to active handling of a call within one AP node, upon an operating failure of a different AP node).

In operation during normal call processing, the AS facility (e.g., AS facility A of FIG. 2) currently controlling an incoming call is enabled to store application and call context information within memory 23 in the call processing subsystem 20 (e.g., centrally or in the respective user-call controllers I and N) on a continually or periodically updated basis while a call is actively being processed by the AP node. In the event of an AP node failure, the responsible standby AS facility (e.g., of node X in FIG. 1) upon call handoff queries the user-call controller to achieve retrieval of the call context information stored in memory 23 by action of the active AS facility prior to failure of its AP node. The retrieved call context information can then be used to bring the now-activated standby AS and CP facilities current with the present state of the call at the time of its handoff. Context information retrieved can include application status, caller entered information such as credit card number, account number, PIN number, call status, etc. The standby AS and CP facilities are thereby empowered to pick up and maintain processing of the call while minimizing lapse caused by failure of the active AP node.

Following the failure of an AP node, such as node 30, calls will no longer be currently connected or routed to it. The call processing subsystem 20 is arranged to determine the loss of connection and attempt to find a substitute AP node for future processing of calls available from the user-call controller formerly using the failed AP node as its primary call processor. This may include temporary use of a standby CP facility of an AP node or rotating usage of the remaining unfailed AP nodes which are available in the system. By application of known techniques, the system can be arranged to automatically implement this activity. A CP facility ready to accept such calls will respond, connect via the network 26 and accept control. The system components involved will control and restructure their internal system context to correspond to the system context of the failed AP node (e.g., rebuild internal data structures and internal state machine based on information previously stored by the primary AP node and its operating facilities). Continuing system operation is thus enabled.

While there have been described the currently preferred embodiments of the invention, those skilled in the art will recognize that other and further modifications may be made without departing from the invention and it is intended to claim all modifications and variations as fall within the scope of the invention.

What is claimed is:

1. A call-protect handoff system, fault responsive to maintain processing of a user-call, comprising:
   a call processing subsystem to receive user-calls and including a plurality of user-call controllers, each to control at least one specific user-call, and memory to store call context information regarding the specific user-call; and
   a plurality of application processor (AP) nodes communicatively coupled to the call processing subsystem to process user-calls, each AP node including at least two call processing (CP) facilities (i) an active CP facility coupled to a user-call controller and (ii) a standby CP facility;
   each of said plurality of user-call controllers actively coupled to the active CP facility of a selected AP node for processing of the specific user-call; and
   each user-call controller arranged, upon a failure event affecting said selected AP node, to cause handoff of the specific user-call to a standby CP facility of a different AP node to maintain processing of that call by use of call context information retrieved from the memory.

2. A call-protect handoff system as in claim 1, wherein the AP node processing a user-call is arranged to store such call context information in said memory while the user-call call is being processed.

3. A call-protect handoff system as in claim 1, wherein the standby CP facility of each AP node is arranged to run continuously in a standby mode when no user-call controller is actively coupled thereto.

4. A call-protect handoff system as in claim 1, wherein each AP node comprises a computer work station arranged to support said active and standby CP facilities.

5. A call-protect handoff system as in claim 1, wherein each CP facility includes a voice operating system.

6. A call-protect handoff system as in claim 1, wherein said call processing subsystem is coupled to said plurality of AP nodes through a local area network.

7. A call-protect handoff system as in claim 6, wherein each user-call controller includes at least one network interface card.

8. A call-protect handoff system as in claim 1, wherein the system is configured, following failure of an AP node, to restore coupling of a user-call controller to an active CP facility of said AP node after the AP node returns to operational availability.

9. A call-protect handoff system, fault responsive to maintain processing of a user-call coupled from an interconnect network, comprising:
   a call processing subsystem to receive user-calls from the interconnect network and including a plurality of user-call controllers including user-call controllers I and N, each to control at least one specific user-call;
   a coupling arrangement; and
   a plurality of application processor (AP) nodes to process user-calls, including AP nodes A, X and Z communicatively coupled via the coupling arrangement to the call processing subsystem, each AP node including both an active and a standby call processing (CP) facility;
   the system configured with user-call controller I actively coupled to the active CP facility of AP node A and also standby coupled to the standby CP facility of AP node X, and user-call controller N actively coupled to the active CP facility of AP node Z and also standby coupled to the standby CP facility of AP node A;
   each user-call controller arranged for handoff of a specific user-call under its control to its standby coupled CP facility, upon a failure event affecting operation of its actively coupled CP facility.

10. A call-protect handoff system as in claim 9, wherein the call processing subsystem includes memory having call context information storage to store call context information regarding a user-call, and wherein the AP node processing a user-call is arranged to store such call context information in said memory while the call is being processed.

11. A call-protect handoff system as in claim 10, wherein an AP node is arranged to access stored call context information from the memory, upon handoff of a call to the standby CP facility of that AP node, to maintain processing of the call.

12. A call-protect handoff system as in claim 9, wherein each AP node comprises a computer work station arranged to support said active and inactive CP facilities and to provide access to a voice operating system.

13. A call-protect handoff system as in claim 9, wherein the standby CP facility of each AP node is arranged (i) to run continuously in a standby mode when no user-call controller is actively coupled thereto, and (ii) to actively process a user-call upon a standby coupling from a user-call controller being upgraded to an active coupling.

14. A call-protect handoff system as in claim 9, wherein said coupling arrangement is a local area network.

15. A call-protect handoff system, fault responsive to maintain processing of a user-call, comprising:
   a call processing subsystem to receive user-calls and including a plurality of user-call controllers to control user-calls, each user-call controller including a network interface card to control, and memory to collect call context information for, a specific user-call;
   a coupling arrangement; and
   a plurality of application processor (AP) nodes coupled via the coupling arrangement to the call processing subsystem to process user-calls, each AP node comprising a computer work station programmed to provide active and standby call processing (CP) facilities and each AP node arranged to store call context information in the memory of a coupled user-call controller;
   the system configured with each user-call controller actively coupled to the active CP facility of a selected AP node for processing of the specific user-call; and
   each network interface card arranged, upon a fault affecting said selected AP node, to cause handoff of the specific user-call to an available standby CP facility of a different AP node to maintain processing of that call by use of call context information retrieved from the memory.

16. A call-protect handoff system as in claim 15, wherein the AP node processing a user-call is arranged to store such context information in said memory while the call is being processed.

17. A call-protect handoff system as in claim 15, wherein the standby CP facility of each AP node is arranged to run continuously in a standby node when no user-call controller is actively coupled thereto.

18. A call-protect handoff system as in claim 15, wherein each AP node comprises a computer work station arranged to support said active and standby CP facilities.

19. A call-protect handoff system as in claim 15, wherein each CP facility includes a voice operating system.

20. A call-protect handoff system as in claim 18, wherein said coupling arrangement is a local area network.

21. Call-protect handoff apparatus, having a call-protect handoff for call processing, comprising:
 a first user-call controller to route a user-call, said user-call controller having call context information storage; and
 a first application processor (AP) node comprising:
  a first active call processing (CP) facility communicatively-coupled to said first user-call controller such that said first active CP facility can process user-calls routed by said first user-call controller; and
  a first standby CP facility available to provide backup call processing for a different user-call controller; and
 a second AP node comprising:
  a second active CP facility available to provide user-call processing for another user-call controller, which may be said different user-call controller; and
  a second standby CP facility coupled to said first user-call controller such that upon a failure event affecting said first active CP facility said first user-call controller communicatively-couples said second standby CP facility to maintain processing of user-calls for continued processing with call context information stored in said call context information storage.

22. A call-protect handoff apparatus as in claim 21, wherein the first AP node is arranged to store such call context information in said call context information storage while said user-call is being processed.

23. A call-protect handoff apparatus as in claim 21, wherein the standby CP facility of each said AP node is arranged to run continuously when no user-call controller is actively coupled thereto.

24. A call-protect handoff apparatus as in claim 21, wherein each CP facility includes a voice operating system.

25. A call-protect handoff apparatus as in claim 21, wherein said first user-call controller is coupled to said AP nodes through a local area network.

26. A call-protect handoff apparatus as in claim 25, wherein said first user-call controller includes a network interface card.

27. A call-protect handoff apparatus as in claim 21, wherein said call context information storage is included in a memory coupled to the first user-call controller.

\* \* \* \* \*